United States Patent
Martinez Martinez et al.

(10) Patent No.: US 9,771,484 B2
(45) Date of Patent: Sep. 26, 2017

(54) METHOD FOR PREPARING A FIRE RETARDANT ADDITIVE FOR COATINGS AND RESULTING PRODUCTS

(75) Inventors: Jesus Manuel Martinez Martinez, Guadalupe (MX); Ricardo Benavides Perez, Torreón (MX); Julio Cesar Rangel Mata, Monterrey (MX); Jose Gertrudis Bocanegra Rojas, Torreón (MX)

(73) Assignee: SERVICIOS ADMINISTRATIVOS PENOLES S.A. DE C.V., Colonia Morales, Secc. Palmas (MX)

( * ) Notice: Subject to any disclaimer, the term of this patent is extended or adjusted under 35 U.S.C. 154(b) by 1560 days.

(21) Appl. No.: 12/514,314

(22) PCT Filed: Apr. 3, 2007

(86) PCT No.: PCT/MX2007/000046
§ 371 (c)(1),
(2), (4) Date: Mar. 1, 2011

(87) PCT Pub. No.: WO2008/056966
PCT Pub. Date: May 15, 2008

(65) Prior Publication Data
US 2012/0312190 A1    Dec. 13, 2012

(30) Foreign Application Priority Data
Nov. 10, 2006  (MX) ................. NL/A/2006/000089

(51) Int. Cl.
| | |
|---|---|
| *C09D 5/14* | (2006.01) |
| *C09D 5/18* | (2006.01) |
| *B82Y 30/00* | (2011.01) |
| *C01F 5/14* | (2006.01) |
| *C01F 7/02* | (2006.01) |
| *C09D 7/12* | (2006.01) |
| *C09D 15/00* | (2006.01) |
| *C09K 21/02* | (2006.01) |
| *C08K 3/22* | (2006.01) |

(52) U.S. Cl.
CPC ............... *C09D 5/18* (2013.01); *B82Y 30/00* (2013.01); *C01F 5/14* (2013.01); *C01F 7/02* (2013.01); *C01F 7/021* (2013.01); *C09D 7/1216* (2013.01); *C09D 7/1266* (2013.01); *C09D 7/1275* (2013.01); *C09D 7/1283* (2013.01); *C09D 15/00* (2013.01); *C09K 21/02* (2013.01); *C01P 2004/52* (2013.01); *C01P 2004/61* (2013.01); *C01P 2004/62* (2013.01); *C01P 2004/64* (2013.01); *C08K 3/22* (2013.01)

(58) Field of Classification Search
CPC ... C09D 5/18; C01F 7/02; C01F 7/026; C01F 5/14
USPC .................................. 252/601; 423/629, 635
See application file for complete search history.

(56) References Cited

U.S. PATENT DOCUMENTS

| | | | | |
|---|---|---|---|---|
| 2,552,314 A | * | 5/1951 | Gloss ........................... | 423/635 |
| 4,145,404 A | * | 3/1979 | Miyata et al. ................ | 423/635 |

\* cited by examiner

*Primary Examiner* — Peter F Godenschwager
(74) *Attorney, Agent, or Firm* — Culhane Meadows PLLC (57) ABSTRACT

The present invention refers to a process for the preparation of an additive with a metallic hydroxide base, and especially of magnesium hydroxide, to be integrated in coatings with the purpose to give them higher flame retarding properties. The hydroxide has an average particle size that is selected from between 1 nanometer and 10 microns preferable with a wide variety, the magnesium hydroxide is submitted to a treatment of washing and dispersion, mainly so that they efficiently are dispersed in, and do not interfere with, the desired properties of the coating. The nature of the coating function is selected from the materials and the conditions of the treatment, as well as the size of the particle. The objective coating can have a base of water, solvents, oil, and alcohol. Compared with coatings formed with other flame retarding compositions, the additive of the invention presents less loss of weight by means of burning through ASTM D1360 standards.

13 Claims, 1 Drawing Sheet

METHOD FOR PREPARING A FIRE RETARDANT ADDITIVE FOR COATINGS AND RESULTING PRODUCTS

TECHNICAL FIELD FOR OF THE INVENTION

The present invention is related to the procedures for the preparation of additives for use in coatings applied to structural elements or as finishing for materials susceptible to combustion, such as wood and its derivatives, with the purpose being to provide properties that are flame retarding once the material to be protected is covered; specifically, the invention discloses a procedure for the preparation of an additive formulated with a metallic hydroxide and a mix of a dispersant, a compatible vehicle (an organic solvent), water and resin that allow the easy incorporation of the additive into the coating.

BACKGROUND OF THE INVENTION

It is well known that the construction of residential buildings or buildings used for the realization of other activities: work, recreation, etc. have a need to incorporate means that help control fires and slow the expansion of a fire. For example, some countries have released regulations on materials for the construction of buildings, as much as for the fabrication of the furniture that is contained within them.

The majority of the furniture has coatings that have esthetic purposes as well as for the protection the material which it is made from, nonetheless, the majority of these coatings are inflammable, which when added to the natural combustible property of the base material, generates an excellent source for the spreading of the fire.

Coatings that are flame retarding can be found Such flame retardants are usually made of phosphates, silicates, borates (intumescent). An intumescent flame retarding material such as those mentioned is characterized by its reaction to fire: first, it forms a foam layer that transforms into ash, which then forms a crust that impedes the penetration of the fire into the base material.

The metallic hydroxides, on the other hand, are used as flame retarding additives, for example, in polymers, with various applications: coatings for cables, furniture, roofing tiles, etc. Magnesium hydroxide has an advantage over other types of flame retarders because it is environmentally friendly and it does not release toxic fumes when utilized as a smoke suppressant.

There already exists a large variety of alternatives to control the problem of fire expansion, through the use of metallic hydroxides. Some examples are mentioned below.

In patent EP 1156092, it describes the fabrication of an adhesive of two components that is created by using magnesium hydroxide, mentioning that said adhesive can be used as a varnish with flame retarding properties.

In the U.S. Pat. No. 6,448,308, it includes magnesium hydroxide as part of the formulation of a coating that is flame retarding that has a base of red phosphorus. The use of the magnesium hydroxide is specifically used for reducing the production of phosphoric acid during the process of flame inhibition.

In U.S. Pat. No. 4,849,298, it describes the use of aluminum hydroxide in the formulation of paints adding it directly to the paint and also, it is used as a substitute for conventional filler in paints ($TiO_2$, for example). The patent describes the effect of the flame retarding properties of coatings prepared with this additive.

By integrating the properly treated magnesium hydroxide into traditional wood coatings, such as varnishes and sealants, or architectonic, such as paints, waterproofing, etc. excellent flame retardation and smoke suppression effects are achieved. The coating thus prepared does not change its final appearance (brightness, transparency, covering power, mechanical strength, etc.)

OBJECTS OF THE INVENTION

In light of the problems seen in the previous inventions, one objective of the present invention is to provide an additive that is a flame retarder and a smoke suppresser when used in the preparation of coatings designed to cover and protect surfaces that are susceptible to combustion, and whose efficiency would be better than those offered by the present flame retardant coatings.

Another objective of the present invention is to provide a flame retarding additive that is easily incorporated into the coating before being applied to the surface it is going to protect.

One more objective of the present invention is that the additive incorporates as the flame resistant ingredient a material that does not generate toxic residues when such is the case that it is exposed to flames.

Another objective of the present invention is for the flame retarding ingredient to be of the family of metallic hydroxides.

Still another objective of the present invention is that the flame retarding ingredient of the additive of the invention does not form groupings in the interior volume of the coating before its application.

One more objective of the present invention is for the flame retarding ingredient of the invention's additive to be distributed in a uniform (homogeneous) manner in the film of the final coating on the surface to be covered and protected.

Another objective of the present invention is that the flame retarding additive does not interfere with the fundamental properties of the coating to which it is added, as an example, the transparency of a varnish.

One more objective of the present invention is the flame retarding ingredient of the additive presents grain finesse similar to that of the coating in which it is included.

A SHORT DESCRIPTION OF THE INVENTION

The additive of the coating prepared with the procedural ingredient of the invention has as a source of its flame retarding properties a metallic hydroxide, preferably of magnesium, with individual characteristics according to the size of the particle, that is submitted to a treatment associated with the nature of the coating into which it will be incorporated, in a way that the resulting additive is able to be efficiency integrated into the coating selected.

Some characteristics of the additive created by the procedure described in the invention are:

a) An average diameter ($D_{50}$) of the particle of the metallic hydroxide is selected from a range of between 1 nanometer to 10 microns, depending on the function of the finish desired of the coating b) The concentration of said particles of metallic hydroxide in the additive can have up to 99% of the weight.

The invention's procedure produces a paste or preferably a suspension of particles of metallic hydroxides treated with other compatible vehicles (organic solvents or water), dispersants and eventually surfactants, in a substance made up of an organic solvent, a dispersant, a resin and in some cases water, that show the following advantages:

1. To offer better efficiency in the flame retardance of the intumescent additives, that in previous comparative tests of the flame retardance show to obtain better results in the coatings mainly with magnesium hydroxide than those with a base that is composed of phosphates. The results are expressed as a percentage of loss of weight by the action of the flame.
2. To be easy to incorporate into the coatings that already exist on the market, without needing to use equipment different from that which is conventionally used for the preparation of coatings, such that the additive has a base that is compatible with the coating into which it will be incorporated.
3. To not alter the final appearance of the coating, which is different from the flame retardants that have a base of phosphorus, in which it is necessary to apply an additional coating that provides the final appearance desired from the finish. With the additive of the invention the characteristics of the shine, the transparency, the ability to cover, the mechanical resistance, etc., of the coating will not be altered.
4. To be environmentally friendly and not harmful to living creatures. In various studies it has been demonstrated that the use of metallic hydroxides in flame retardant coatings has advantages over products such as those that use halogenous and phosphoric compounds, because they do not give off toxic gasses, and the release of water in the reaction of the decomposition of the hydroxide helps control the smoke emissions.
5. The surface treatment given to the magnesium hydroxide is selected from a series of surface additives that help make the magnesium hydroxide compatible with the resin of the additive and the coating object, maintaining the characteristics, such as the brightness, transparency, covering power, mechanical resistance, etc., of the coating object.

DESCRIPTION OF THE FIGURES

For a better understanding of the description that follows, the attached FIGURE should be regarded when reading the description.

DETAILED DESCRIPTION OF THE INVENTION

The additive prepared according to the procedure of the present invention is created from a metallic hydroxide with an average particle size selected from the range of 1 nanometer to 10 microns, preferably being monodispersed, and having a wide variety of sizes and with a purity of at least 90%.

The metallic hydroxide particles are submitted to a treatment for their integration into the final coating, so that they can be separated from a hydroxide in an aqueous, organic or dust suspension, without which the compatibility between the initial hydroxide vehicle and the base of the additive that will be formed would be limited.

Figure 1:
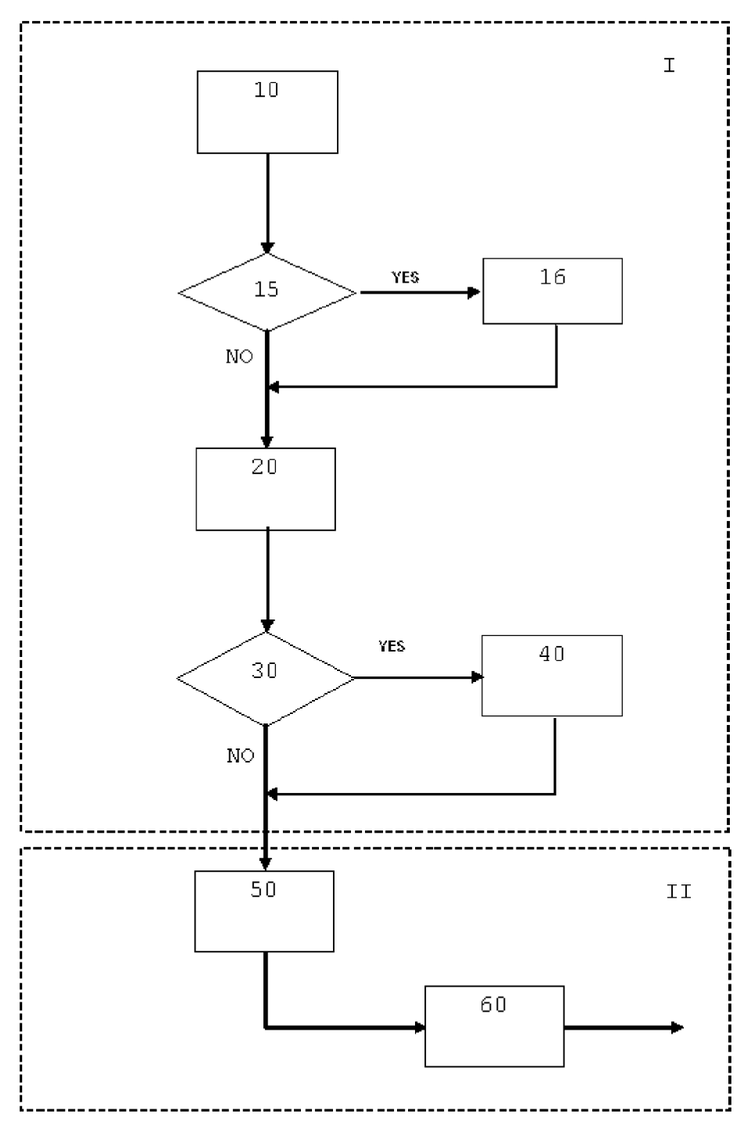
FIG. 1 is a diagram of blocks that represent the procedure for the creation of the additive, the purpose of the invention.

In the preferred form of the present invention, the metallic hydroxide is magnesium hydroxide. It has as an advantage in addition to its flame retarding properties, that it helps control the emission of fumes upon releasing the water when the elements in the reaction break down (1):

With reference to FIG. 1, which is a diagram of blocks of the process of the production of the additive of the invention, it is presented in two zones: the first composed of the blocks from (10) to (40) that represent the pretreatment of the particles of metallic hydroxide, and the zone composed of blocks (50) and (60) representing the process of the preparation of the additive itself.

In zone I, or the pretreatment phase, the block (10) represents the flame retarding ingredient that will be used for the preparation of the additive, preferably being a wet paste of metallic hydroxide although for some very specific applications that require the absence of water, it is preferable to use a hydroxide in a dry powdery form. As was mentioned before, the hydroxide is formed by particles with an average size in the range from 1 nanometer to 10 microns and with a purity of at least 90%. This material is added to the following block.

The block (20) represents an operation called the "change of vehicle" in which the wet paste of the metallic hydroxide is washed in order to displace the water contained therein and substituting a "compatible" organic solvent, that is, it is incorporated without provoking separation of the stages, with the solvent or the thinner of the final application (the "objective" coating), which will stop in the moment the formation of lumps when it comes in contact with the objective coating; the process takes place with strong agitation, preferably for between 5 and 30 minutes, or for the time deemed necessary. The mix will be maintained in agitation in a turbulent pattern by means of a diffuser with a sharp disk or other device that allows the peripheral velocity to be at least 2 m/sec and up to 30 m/sec. After the agitation, the separation of the stages results and the process can be repeated until a residual humidity of less than 5% is obtained when in the solid state.

When by the nature of the solvent or the thinner and of the resin of the final application, the metallic hydroxide could react, it is evaluated, as is indicated by the block (15), in order to give the particles a surface treatment (16) before the operation of the "change of vehicle" (20), using conventional surfactants compatible with the objective coating.

The process of the "change of vehicle" (20) serves to guarantee that the hydroxide particles do not group together in the dispersion process (50) in Zone II, in the incorporation to the coating or in the application of the same on to the surface to be treated.

The block of decision (30) indicated that in case that the tolerated residual humidity in the additive is very low, close to zero, due to the nature of the resin and solvents or thinners in the objective coating and once the "change of vehicle" (20) stage is complete, the solid phase is summated to a process of drying (40), where the temperature of the operation in said drying stage always needs to be lower than the boiling point of the vehicle. The operation continues until the tolerated residual humidity for the objective coating is obtained.

The result of the operation is a "dry" powder of hydroxide that can be stored for the later preparation of the additive. The product obtained by this means can remain as a "dry" powder dispersible for periods of 12 months.

If in the final application a humidity content of 5% is tolerated, the drying stage that is represented by block (30) is omitted.

The product obtained, be it "dry" or wet, coming from one of the two previous steps of the first phase of the process then passes to a process of dispersion (50), in Zone II, which is adequately identified with the preparation of the additive ready for use in the objective coating that is the material of the present invention.

In this stage, the paste or the "dry" powder coming from blocks (20) or (30), are added to a process of dispersion (50) where a compatible resin and a compatible dispersant are added to the objective coating, according to the following table:

product that can be in the preferred form, a formulation with up to 99% of its weight in metallic hydroxide.

Among the advantages that the additive has obtained by the process of the invention are that as a consequence of the treatment of the change of vehicle in stage (20) and the mix with resins and dispersants in stage (50), the product is completely compatible with the objective coating for that which was prepared during the selection of the appropriate surfactant, resin and dispersant according to the table previously included, furthermore, maintaining a high grade of homogeny in the dispersion of the metallic hydroxide par-

TABLE 1

Recommended selection of the resin and the dispersant for the preparation of the additive, taking into account the nature of the coating

| TYPE OF OBJECTIVE COATING | RESIN RECOMMENDED FOR THE DISPERSION | DISPERSANT RECOMMENDED FOR THE DISPERSION |
|---|---|---|
| Polyurethane | Polyester | Copolymer with acidic groups, alkylammonium chloride salt of a polycarboxylic acid, alkylammonium chloride salt from a non saturated fatty acid, salt of non saturated polyaminoamide and polyester acids with low molecular weight, unsaturated polyaminoamide and polyester acids of low molecular weight |
| UV Curing | Epoxy-acryate | Copolymer with acidic groups, alkylammonium salt of a polycarboxylic acid, alkylammonium salt of a non saturated fatty acid, salt of non saturated polyaminoamide and polyester acids with low molecular weight, salt of unsaturated polyaminoamide and polyester acids with low molecular weight |
| Acrylic-styrene | Acrylic-styrene | Ammonium salts of an acrylic copolymer, salt of alkylammonium and a multifunctional polymer of a anionic character, sodium salt of an acrylic copolymer |
| Vinyl | Vinyl | Ammonium salt of an acrylic copolymer, salt of alkylammonium and a multifunction polymer with an anionic character, sodium salt of an acrylic copolymer |
| Alkydalic Enamel | Alkydalic Resin | Copolymer with groups of acids, alkylammonium salt of a polycarboxilic acids, alkylammonium salt of a non saturated fatty acid, salt of non saturated polyaminoamide and polyester acids with low molecular weight, salt of an unsaturated polyaminoamide and polyester acids of low molecular weight |
| 0% composed of organic volatiles | Acrylic-styrene. Vinyl, Vinilica, Acrylic epoxy | Ammonium salt of an acrylic copolymer, salt of alkylammonium and a multifunctional polymer with an anionic character, sodium salt of an acrylic copolymer |
| Nitrocellulosic | alkydalic or Stabilized nitrocellulose | Copolymer with acidic groups, alkylammonium salt of a polycarboxylic acid, alkylammonium salt from a non saturated fatty acid, salt of non saturated polyaminoamide salt and polyester acids with low molecular weight, unsaturated polyaminoamide salts and polyester acids of low molecular weight |
| Alkydalic | Alkydalic of soy or coconut, lecithin | Copolymer with acidic groups, alkylammonium salt of a polycarboxylic acid, alkylammonium salt from a non saturated fatty acid, salt of non saturated polyaminoamide and polyester acids with low molecular weight, unsaturated polyaminoamide salt and polyester acids of low molecular weight |
| Phenolic | Phenolic Resin | Copolymer with acidic groups, alkylammonium salt of a polycarboxylic acid, alkylammonium salt from a non saturated fatty acid, salt of non saturated polyaminoamide and polyester acids with low molecular weight, unsaturated polyaminoamide salt and polyester acids of low molecular weight |

The dispersion (50) is done by means of an agitator or a disperser having a peripheral velocity of between 15 and 30 m/sec. The viscosity of the mix is adjusted to that of the objective coating by the addition of the solvent or the thinner that preferably is of the same base that will be used with the coating or at least should be compatible with it. The percentage of dispersant in the mix is maintained between 0.5 and the 10% in relation to the hydroxide in the dry base.

The product (60) obtained from the process of the dispersion (50) is the additive of the invention, the same ticles in the formation. For that which when added to the objective coating, the additive will integrate quickly and easily and it is guaranteed that the particles maintain the homogeny throughout the whole volume and thus, in the layer of the coating after the application onto the surface it is to protect.

In the preferred means of the invention, useful in the case of transparent finishes, particles with an average size in the range of nanoparticles with a low variability (monodisperse) are used with those that the properties of the transparency of the varnish are not altered, that which is not guaranteed with particles of larger sizes or with a non homogenous sample or a sample of wide dispersion.

For that reason, it is suggested that in the preparation of an additive for transparent varnishes to use particles from the extreme low end of the average size range. In the same way, with opaque coatings it is acceptable to use particles of larger sizes, and in the texturized finishes, particles from the extreme high end of the range can be used.

The use of particles from the extreme high end of the range (10 microns) does not guarantee a homogenous distribution in the layer of the coating on the surface that it is to protect, and thus, the flame retardant efficiency is considerably diminished.

Table 2 shows a summary of the selections of the reagents and the parameter values recommended for a variety of classes of conventional coatings used for common applications, that is possible to create additives, following the procedure according to the present invention, that will offer the characteristics of being easy to incorporate into the objective coating, homogenous (uniform) distribution of the particles of the flame retarding and smoke repressing ingredient, and conservation of the desired properties of the coating to name a few.

TABLE 2

Materials and parameters recommended for various types of coatings.

| Type of coating | | Size of the $Mg(OH)_2$ Particles | Humidity in the initial hydroxide | Vehicle for the process of the "change of Vehicle" | Humidity of the Hydroxide before the Dispersion | Dispersant for the dispersion | Solvent or thinner for the dispersion | Fineness |
|---|---|---|---|---|---|---|---|---|
| Varnishes | Nitrocellulose | 1 to 190 nm | Less than 65% | Aryl Ketones, aryl alcohols, Glycol ester, glycol ether, etc. | Less than 5% | Copolymer with acidic groups, alkylammonium salt of a polycarboxylic acid, alkyl-ammonium salt from a non saturated fatty acid, salt of non saturated polyaminoamide and polyester acids with low molecular weight, unsaturated polyaminoamide and polyester acids of low molecular weight | Ketones, esters, alcohols, glycol esters, glycol esters, etc. | Less than 60 μm |
| | alkylammonium | 1 to 190 nm | Less than 65% | Aryl Kepones, aryl alcohols, glycol ester, glycol ether, etc. | Less than 5% | Copolymer with acidic groups, alkylammonium salt of a polycarboxylic acid, alkylammonium salt from a non saturated fatty acid, non saturated polyaminoamide salt and polyester acids with low molecular weight, unsaturated polyaminoamide and polyester acids of low molecular weight | Hydro carbonate, ketones, esters, alcohols, glycol ethers, glycol esters | Less than 20 μm |
| | Phenolic | 1 to 190 nm | Less than 65% | Aryl Ketones, aryl alcohols, Glycol ester, glycol ether, etc. | Less than 5% | Copolymer with acidic groups, alkylammonium salt of a polycarboxylic acid, alkylammonium salt from a non saturated fatty acid, non saturated polyaminoamide salt and polyester acids with low molecular weight, unsaturated | Hydro carbonate, ketones, esters, alcohols, glycol ethers, glycol esters | Less than 20 μm |

TABLE 2-continued

Materials and parameters recommended for various types of coatings.

|  | Type of coating | Size of the Mg(OH)$_2$ Particles | Humidity in the initial hydroxide | Vehicle for the process of the "change of Vehicle" | Humidity of the Hydroxide before the Dispersion | Dispersant for the dispersion | Solvent or thinner for the dispersion | Fineness |
|---|---|---|---|---|---|---|---|---|
|  | Polyurethane | 1 to 190 nm | less than 65% | Aryl Ketones, aryl alcohols, Glycol ester, glycol ether, etc. | less than 5% | polyaminoamide and polyester acids of low molecular weight Copolymer with acidic groups, alkylammonium salt of a polycarboxylic acid, ethyl ammonium chloride salt from a non saturated fatty acid, salt of non saturated polyaminoamide and polyester acids with low molecular weight, unsaturated polyaminoamide and polyester acids of low molecular weight | Hydro carbonate, ketones, esters, alcohols, glycol ethers, glycol esters | less than 20 μm |
| PAINTS | Vinyl | 1 to 5 μm | less than 5% | Water | less than 5% | Ammonium salt of an acrylic copolymer, salt of alkylammonium a multifunctional polymer with an anionic character, sodium salt of an acrylic copolymer | Water | less than 50 μm |
|  | Acrylic Vinyl | 1 to 5 μm | less than 5% | Water | less than 5% | Ammonium salt of an acrylic copolymer, salt of alkylammonium and a multifunctional polymer with an anionic character, sodium salt of an acrylic copolymer | Water | less than 50 μm |
|  | Oil | 1 to 2 μm | less than 5% | Aryl Ketones, aryl alcohols, Glycol ester, glycol ether, etc. | less than 5% | Copolymer with acidic groups, alkylammonium salt of a polycarboxylic acid, alkylammonium salt from a non saturated fatty acid, salt of non saturated polyaminoamide and polyester acids with low molecular weight, unsaturated polyaminoamide and polyester acids of low molecular weight | Hydro carbonate, ketones, esters, alcohols, glycol ethers, glycol esters | less than 50 μm |
|  | Emulsion | 1 to 190 nm | less than 5% | Aryl Ketones, aryl alcohols, Glycol ester, glycol ether, etc.. | less than 5% | Ammonium salt of an acrylic copolymer, salt of alkylammonium and a multifunctional polymer with an anionic character, sodium salt of an acrylic copolymer | Water | less than 20 μm |

TABLE 2-continued

Materials and parameters recommended for various types of coatings.

| Type of coating | Size of the Mg(OH)$_2$ Particles | Humidity in the initial hydroxide | Vehicle for the process of the "change of Vehicle" | Humidity of the Hydroxide before the Dispersion | Dispersant for the dispersion | Solvent or thinner for the dispersion | Fineness |
|---|---|---|---|---|---|---|---|
| UV | 1 to 190 nm | less than 2% | Aryl Ketones, aryl alcohols, Glycol ester, glycol ether, etc. | less than 2% | Copolymer with acidic groups, alkylammonium salt of a polycarboxylic acid, alkylammonium salt from a non saturated fatty acid, non saturated polyaminoamide and polyester acids with low molecular weight, unsaturated polyaminoamide and polyester acids of low molecular weight | Alcohols with 6 carbons or more, esters with 6 carbons or more, monomers | less than 15 μm |
| TEXTURIZED Styrene-arylic | 1 to 5 μm | less than 5% | Water | less than 5% | Ammonium salt of an acrylic copolymer, salt of alkylammonium and a multifunctional polymer with an anionic character, sodium salt of an acrylic copolymer | Water | less than 60 μm |
| Acrylic Vinyl | 1 to 5 μm | less than 5% | Water | less than 5% | Ammonium salt of an acrylic copolymer, salt of alkylammonium and a multifunctional polymer with an anionic character, sodium salt of an acrylic copolymer | water | less than 60 μm |

For a better understanding of the use of the data contained in tables 1 and 2, the following examples are realized according to standards ASTM D1360. They offer illustrations of diverse alternatives for the creation of the additives according to the procedure of the present invention.

Example 1. Preparation of the Additive to be Used in a Coating with an Alkydalic Base Having a Residual Humidity of Less than 5%

1. Separate nanometric magnesium hydroxide with a humidity of 65% that has the following distribution of particle sizes: $D_{10}$, 59.0 nm; $D_{50}$, 92.7 nm; $D_{90}$, 153 nm; measured by laser ray diffraction in a machine marked COULTER LS 230. For the purpose of illustration, we will use 1200 grams.
2. Place the magnesium hydroxide in a 6 Liter recipient that has a pour spout.
3. Pour 3600 grams of ethylene glycol butyl ether, and agitate (dispersing) with a dispersing propeller to a peripheral velocity of between 5 and 30 m/sec. This agitation (dispersion) is maintained for a period of between 5 and 15 minutes.
4. With the help of a centrifuge, a decanter, a filter, or other means of separating solids from liquids, remove as much of the liquid part as possible, depending on the function of the equipment selected for completing the separation.
5. With the paste obtained, repeat steps 3 and 4 until the content of water in said material is less than 5%.
6. The paste then from step 5 is placed in an appropriate drying machine and the organic solvent is eliminated. The dryer should not be operated at a temperature higher than the boiling point of the solvent, this guarantees that the powder of magnesium hydroxide obtained does not suffer changes in the side of the particle and that its integration to the flame retarding additive will be efficient.
7. Place 590 grams of alkydalic resin into a 1.0 liter Berzelius beaker without a spout.
8. The beaker will be placed in a dispersion machine provided with a deflector and a propellant for the dispersion.
9. The resin is to be agitated at a moderate velocity: peripheral velocity of between 1 and 5 m/s.
10. Pour in ten grams of the dispersant DCM-305 (a copolymer with groups of acids), that is compatible with the resin.
11. Add to it 400 grams of the magnesium hydroxide that was obtained in point 6.
12. Maintain medium agitation until the magnesium hydroxide is completely humid.

13. Once the mix is homogenous, the velocity of the disperser is increased until it has enough cutting force that guarantees an efficient distribution: peripheral velocity between 15 and 30 m/s.
14. The dispersion is maintained during 15 minutes or the time necessary to reach the fineness of the application.

Example 2. Preparation of the Additive to be Used in a Coating with a Nitrocellulosic Base that has a Required Residual Humidity of Less than 5%

1. Place 490 grams of the nitrocellulose resin in a 1.0 liter Berzelius beaker without a spout.
2. Place the beaker in a dispersion machine provided with a deflector and a propellant for the dispersion of 7 centimeters of diameter.
3. Agitate the resin at a moderate velocity.
4. Pour 10 grams of the dispersant DCM-305 (a copolymer with groups of acids), that is compatible with the resin.
5. Add in 400 grams of dry magnesium hydroxide with particle size being an average of 100 nanometers.
6. Maintain moderate agitation until the magnesium hydroxide is completely humid.
7. Once the mix is homogenous, the velocity of the disperser is increased until it has enough cutting force that guarantees an efficient distribution: peripheral velocity between 15 and 30 m/s.
8. The dispersion is maintained during 15 minutes or the time necessary to reach the of the application.

The flame retarding additive for the alkydalic varnish, prepared in Example 1, can be mixed in different proportions with any alkydalic varnish that is found on the market. Also, the flame retarding additive for the nitrocellulose based sealer prepared in Example 2 can be mixed with any nitrocellulose based sealer that is on the market.

Frequently, a wood varnish is used for its sealant properties as well as its varnishing properties. Table 3 shows different combinations of sealers and varnishes mixed with the flame retarding additives prepared in Examples 1 and 2, and the results upon submitting them to the flame test according to the ASTM D1360.

TABLE 3

Effect as the percentage of weight lost by the action of the flames, of the content of $Mg(OH)_2$ in a nitrocellulose based sealer and a varnish with an alkydalic based resin both applied to a sample of wood.

| | | Test Number | | | | Control | |
|---|---|---|---|---|---|---|---|
| | | 1 | 2 | 3 | 4 | Group | Intumescent |
| Sealer | Type of resin | Nitrocellulose | Nitrocellulose | Nitrocellulose | Nitrocellulose | Nitrocellulose | — |
| | Additive/Sealer | 1/7 | 1/7 | 1/1 | 1/1 | 0 | — |
| Varnish | Type of resin | alkydalic | alkydalic | alkydalic | alkydalic | alkydalic | — |
| | Additive/Varnish | 1/7 | 1/1 | 1/7 | 1/1 | 0 | — |
| | Loss of weight (%) | 7.8 | 5.5 | 3.5 | 1.7 | 62.8 | 17.5 |

Table 4 shows the rest of the examples of the additives prepared with different types of resins that have applications to different types of coatings.

TABLE 4

Preparation of a flame retardant additive

| Ex. # | Metallic Hydroxide | $D_{50}$ mm | Initial Humidity | Change of Vehicle | Final Humidity | Resin of the coating | Dispersant | Surfactant |
|---|---|---|---|---|---|---|---|---|
| 1 | $Mg(OH)_2$ | 0.0927 | 65% | ethylene glycol butyl ether | >5% | alkydalic | Copolymer with acid groups | — |
| 2 | $Mg(OH)_2$ | 0.0927 | <5% | — | <5% | Nitrocellulose | Copolymer with acid groups | — |
| 3 | $Mg(OH)_2$ | 0.0927 | <5% | — | <5% | Phenolic | Copolymer with acid groups | Methyl hydrogen polysiloxane |
| 4 | $Mg(OH)_2$ | 1.102 | <5% | — | <5% | Polyurethane | Copolymer with acid groups | Methyl hydrogen polysiloxane |
| 5 | $Mg(OH)_2$ | 1.102 | 55% | water | >5% | Vinyl | Ammonium salt made of an acrylic copolymer | Methyl hydrogen polysiloxane |
| 6 | $Mg(OH)_2$ | 1.102 | 55% | water | >5% | Acrylic vinyl | Ammonium salt made of an acrylic copolymer | Methyl hydrogen polysiloxane |
| 7 | $Mg(OH)_2$ | 1.102 | <5% | — | <5% | Alkydalic | Copolymer with acid groups | Methyl hydrogen polysiloxane |

TABLE 4-continued

Preparation of a flame retardant additive

| Ex. # | Metallic Hydroxide | $D_{50}$ mm | Initial Humidity | Change of Vehicle | Final Humidity | Resin of the coating | Dispersant | Surfactant |
|---|---|---|---|---|---|---|---|---|
| 8 | $Mg(OH)_2$ | 1.102 | 55% | water | >5% | Alkydalic 0-VOC | Ammonium salt made of an acrylic copolymer | Methyl hydrogen polysiloxane |
| 9 | $Mg(OH)_2$ | 1.102 | <5% | — | <5% | Acrylic epoxy catalyzed by UV | Copolymer with acid groups + Salt non saturated polyamino amide and polyester acids with low molecular weight | Methyl hydrogen polysiloxane |
| 10 | $Mg(OH)_2$ | 1.102 | 55% | water | >5% | Acrylic—styrene | Ammonium salt made of an acrylic copolymer | Methyl hydrogen polysiloxane |
| 11 | $Al(OH)_3$ | 6.86 | >5% | — | <5% | Alkydalic | Copolymer with acid groups | Methyl hydrogen polysiloxane |
| 12 | $Al(OH)_3$ | 6.86 | 40% | water | >5% | Vinyl | Ammonium salt made of an acrylic copolymer | Methyl hydrogen polysiloxane |
| 13 | $Al(OH)_3$ | 6.86 | <5% | — | <5% | Polyurethane | Copolymer with acid groups | Methyl hydrogen polysiloxane |
| 14 | $Al(OH)_3$ | 6.86 | 40% | water | >5% | Alkydalic 0-VOC | Ammonium salt made of an acrylic copolymer | Methyl hydrogen polysiloxane |

The effects of the use of the additive with magnesium hydroxide in the wood coatings in the previous tests are illustrated in Table 5. They show the result of the examples of the application of the prepared additive according to the previously described procedure.

The effect of the flame retardant when the coating includes magnesium hydroxide can be clearly observed. In the physical tests, it can be seen that that there is no change in the final appearance of the coating with the additive of the invention after its application with respect to the appearance that the coating offers without the additive; this is also valid for coatings that have a high transparency such as varnishes.

TABLE 5

Effect of the flame retarding additive, as a percentage of the weight loss, applied in a sample of wood according to the ASTM D1360.

| Sealer | | Coating | | | |
|---|---|---|---|---|---|
| Type of Sealer | Additive/Sealer | Type of Coating | Additive/Coating | Metallic Hydroxide | Weight Loss (%) |
| Nitrocellulose | 1/7 | Alkydalic varnish | 1/7 | $Mg(OH)_2$ | 7.8 |
| Nitrocellulose | 1/7 | Phenolic Varnish | 1/7 | $Mg(OH)_2$ | 3.6 |
| Nitrocellulose | 1/1 | Alkydalic varnish | 1/1 | $Al(OH)_3$ | 14.3 |
| — | — | Intumescent | — | — | 17.5 |
| Nitrocellulose | — | Alkydalic varnish | — | — | 62.8 |
| Nitrocellulose | — | Phenolic Varnish | — | — | 66.1 |
| — | — | Alkydalic varnish 0-VOC | 1/1 | $Mg(OH)_2$ | 6.7 |
| — | — | Varnish of Acrylic epoxy catalyzed by UV | 1/1 | $Mg(OH)_2$ | 30.1 |
| — | — | Polyurethane varnish | 1/1 | $Mg(OH)_2$ | 11.4 |
| — | — | Alkydalic varnish 0-VOC | — | — | 61.3 |
| — | — | Varnish of Acrylic epoxy catalyzed by UV | — | — | 71.0 |
| — | — | Polyurethane varnish | — | — | 72.4 |
| — | — | Alkydalic enamel | 1/1 | $Mg(OH)_2$ | 2.8 |

TABLE 5-continued

Effect of the flame retarding additive, as a percentage of the weight loss, applied in a sample of wood according to the ASTM D1360.

| Sealer | | Coating | | | |
|---|---|---|---|---|---|
| Type of Sealer | Additive/ Sealer | Type of Coating | Additive/ Coating | Metallic Hydroxide | Weight Loss (%) |
| — | — | Alkydalic enamel | — | — | 8.2 |
| — | — | Acrylic Styrene waterproofer | 1/1 | $Mg(OH)_2$ | 10.7 |
| — | — | Acrylic Styrene waterproofer | — | — | 58.4 |
| — | — | Acrylic Vinyl Paint | 1/1 | $Mg(OH)_2$ | 5.2 |
| — | — | Vinyl Paint | 1/1 | $Mg(OH)_2$ | 6.0 |
| — | — | Acrylic Vinyl Paint | — | — | 52.6 |
| — | — | Vinyl Paint | — | — | 52.6 |

In this aspect, the size of the hydroxide particles is important, as well as the uniformity of the size and the homogeny of the distribution of the particles in the final layer of the coating once applied.

As has been described and illustrated through the previous examples, the present invention is directed to the preparation of an additive that has the properties of a flame retardant and a suppresser of smoke, without affecting the properties of the coating to which it is added.

In the examples, there has been used some common coatings for the protection of surfaces, in particular wood and its derivative, as can be seen by a technician with knowledge of the art, these examples do not limit the reach of the invention but they are to be illustrative of the same, and the use of the additive in other coatings for the application to other surfaces, is found to be also within the reach of the present invention that, thus should be considered in light of the following claims.

The invention claimed is:

1. A procedure for preparing a flame retarding additive to be incorporated into an objective coating to protect surfaces susceptible of combustion; said additive comprises a base composed by a metallic hydroxide as flame retarding agent and smoke suppresser, said procedure comprises: (a) a first phase of pre-treatment of said flame retarding agent; and (b) a second phase of preparing said additive;

wherein said first phase comprises the steps of:
i) providing a humid paste of initial metallic hydroxide;
ii) washing said humid paste of metallic hydroxide with an organic solvent so as to displace the water contained in said paste by means of stirring between 5 and 30 minutes, in order to substitute said contained water by said organic solvent, and with which a change of vehicle is carried out;
iii) drying said solid phase of metallic hydroxide at a lower temperature than the boiling temperature of said organic solvent, in order to obtain a dry powder of the metallic hydroxide having an average particle size of 1 nm to 10 microns, and a purity of at least 90%;

wherein the second phase comprises the steps of:
iv) dispersing said dry powder of the metallic hydroxide by means of a stirrer into a peripheral velocity from 5 m/s to 30 m/s;
v) removing the finished additive from the stirrer;
and wherein in the step of dispersing the dry powder of the metallic hydroxide, a resin and a dispersant are mixed with said dry powder, in order that said additive is integrated to said objective coating by adjusting the viscosity of said additive to that of said objective coating.

2. The procedure for the preparation of a flame retarding additive according to claim 1, wherein after the washing step, a separation of the phases is carried out, as well as the elimination of the liquid phase of the metallic hydroxide.

3. The procedure for the preparation of a flame retarding additive according to claim 1 wherein the washing step is repeated until a residual humidity of 5% is obtained.

4. The procedure for the preparation of a flame retarding additive according to claim 3, wherein the metallic hydroxide is magnesium hydroxide.

5. The procedure for the preparation of a flame retarding additive according to claim 1 wherein the vehicle for the water displacement is selected from the group consisting of solvents or thinners that will act as a solvent or thinner of the objective coating.

6. The procedure for the preparation of a flame retarding additive according to claim 5 wherein the vehicle for the water displacement is the same solvent or thinner as that found in the objective coating.

7. The procedure for the preparation of a flame retarding additive according to claim 1 wherein if the metallic hydroxide is susceptible to react with the selected agent for the wash or the resin of the coating, the metallic hydroxide is treated with surfactants before the washing step.

8. The procedure for the preparation of a flame retarding additive according to claim 1, wherein the percentage of the dispersant in the mixture is maintained between 0.5% and 10% in relation to the hydroxide in the dry base.

9. The procedure for the preparation of a flame retarding additive according to claim 1, wherein the product obtained is a flame retarding additive that contains from 5 to 99% by weight of metallic hydroxide.

10. The procedure for the preparation of a flame retarding additive according to claim 9, in which said metallic hydroxide is able to be stored for 12 months preserving its flame retarding properties.

11. The procedure for the preparation of a flame retarding additive according to claim 1, wherein the product obtained is a flame retarding additive that contains 5% to 99% metallic hydroxide by weight.

12. The procedure for the preparation of a flame retarding additive according to claim 1, wherein the percentage of dispersant in the mixture is maintained between 0.5% and 10% by weight relative to the dry powder of the metallic hydroxide.

13. The procedure for the preparation of a flame retarding additive according to claim 1, wherein the metallic hydroxide is magnesium hydroxide.

\* \* \* \* \*